Dec. 23, 1969        A. W. SPICER        3,485,707
BELT
Filed May 31, 1966

INVENTOR.
ALVIN W. SPICER
BY W. A. Shira, Jr.
ATTY.

3,485,707
BELT
Alvin W. Spicer, Cuyahoga Falls, Ohio, assignor to The B. F. Goodrich Company, New York, N.Y., a corporation of New York
Filed May 31, 1966, Ser. No. 554,160
Int. Cl. D03d 13/00; B32b 3/10, 5/02
U.S. Cl. 161—78
9 Claims

ABSTRACT OF THE DISCLOSURE

Industrial belts for power transmission or conveying of materials characterized by a body of elastomer provided with at least one layer of longitudinally extending tension resisting cords and at least one layer of uncrimped monofilaments extending parallel to each other and substantially at right angles to the tension resisting cords on one side of the latter, the monofilaments being interlooped by binding threads which substantially cover the monofilaments but do not extend between the tension cords thereby providing a longitudinally flexible structure which has improved resistance to lateral flexure.

---

This invention relates to belts and, more particularly, to improved industrial belts of the type employed for transmission of power or conveying of materials.

Industrial belts, especially those employed for transmission of power or for certain material conveying applications, should exhibit substantial transverse rigidity. For example, belts of the side driving type, of which those which are generally V-shape in cross section are representative, should resist flexure in a direction laterally of the length in order to prevent buckling, roll-over and related improper functioning which reduces the life of the belt and impair its power transmitting capability. Nevertheless, this resistance to lateral flexure should not increase the longitudinal stiffness of the belt since this would impair the ability of the belt to function properly upon pulleys of small diameter.

Prior attempts to provide lateral stiffness in belts, especially those of the side driving type, have included the provision of a generally sinuously extending wire lying in a plane parallel with the radially outer surface of the belt, the incorporation of a layer of high modulus rubber in the belt, or the use of a fabric having cords disposed at right angles to the tension members of the belt. These prior expedients have, however, been unsatisfactory for a number of reasons which include the greater tendency of the belts to delaminate, an undesirable decrease in longitudinal flexibility, and increased cost.

In accordance with this invention, the requisite lateral stiffness of industrial belts is achieved without the defects and limitations of prior constructions by incorporating in the belt at least one layer of monofilaments which extend parallel to each other and at substantially right angles to the tension resisting members of the belt. The monofilaments are retained in parallel single layer form during incorporation in the belt and union of the monofilaments with the elastomer of the belt are facilitated by the monofilaments being interlooped by binding elements extending in a diretsion at right angles to the monofilaments with all of the crimp being in the said binding elements. Preferably, these binding elements are cotton yarns or cords and the monofilaments are nylon with the cotton elements interwoven about the nylon elements in a leno-type weave. The lateral stiffening layer may be disposed either between the tension resisting members and the outer surface of the belt, or between the tension resisting members and the inner surface of the belt, or on both sides of the tension resisting members.

The advantages and nature of the invention will be further apparent from the following description of a preferred embodiment, and certain modifications thereof, described with reference to the accompanying drawing, forming a part of the application, and in which.

Figure 1:
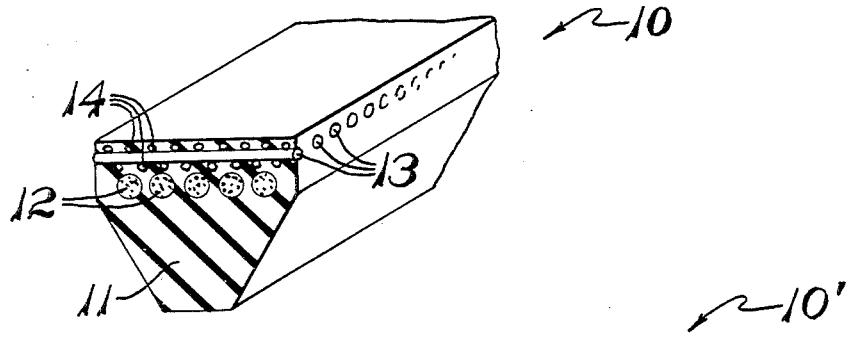
FIG. 1 is a view, partly in transverse section and partly in perspective, of a portion of a belt incorporating the preferred embodiment of the invention.

The invention is illustrated in FIG. 1 as embodied in a side driving belt 10 of generally V-shape cross section. This belt comprises the usual compression portion 11, formed of elastomer, and tension resisting members 12, which may be high strength cords of low elongation. The belt is provided, adjacent the outer surface thereof and on the side of the layer of tension resisting members 12 opposite the compression portion 11, with a lateral stiffening means in the form of a layer of monofilaments 13. These monofilaments extend generally at right angles to the direction of the length of the tension resisting members 12 and are united therewith and with the remainder of the body of the belt by suitable elastomer. The monofilaments 13 are in a single layer and extend without interlooping or intertwining thereof with any other components of the belt. These monofilaments are, however, preferably interlooped by binding elements 14 which may be yarns or cords of a textile material.

Figure 4:
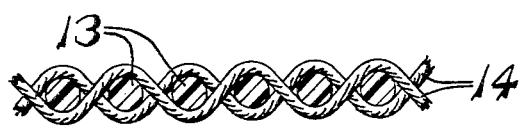
FIG. 4 is a sectional view, to an enlarged scale, through a portion of the fabric employed to provide lateral stiffness in the belt, the section being taken at right angles to the length of the lateral stiffening elements.

The lateral stiffening means is preferably provided by weaving the binding elements 14 about the parallel monofilaments 13 in a generally leno-type weave as is shown in FIG. 4. The monofilaments may be formed of any suitable material but preferably are nylon. The binding elements 14 are preferably cotton and substantially cover the nylon monofilaments.

In constructing a belt of the type illustrated in FIG. 1 it is preferably formed in endless configuration by placing upon a suitable building drum a layer of elastomer which will provide the compression portion 11. The tension resisting elements 12 are then placed upon this elastomer and the lateral stiffening means, after first having been provided with elastomer, is disposed upon the tension resisting elements in a manner such that the binding elements 14 extend generally parallel with the tension resisting elements 12 while the monofilaments 13 extend at right angles thereto.

Preferably, the lateral stiffening material is prepared for incorporation in the belt by first frictioning elastomer on both faces thereof and then additionally calendering a layer of elastomer on the surface which is to be adjacent the tension resisting members 12. When the binding elements 14 are cotton, no adhesive dip need be employed prior to the application of the elastomer. However, in those cases where the binding elements are a textile material other than cotton, an appropriate treatment thereof with a substance which promotes adhesion to rubber can be made prior to the application of elastomer.

The belt materials, assembled as just described, are then vulcanized to form an integral band or sleeve which is then formed into individual belts by cutting the assembled materials in a direction parallel with the tension resisting members and in widths corresponding to the completed belts. In the event the belts are to be employed in covered form, the assembled material is cut into individual belts and covered by fabric before curing. In either case, the resulting belts exhibit improved lateral stiffness over conventional constructions that do not utilize the lateral stiffening layer. However, the improved belts do not exhibit any loss of longiudinal flexibility since the lateral stiffening layer can flex between each of the monofilaments.

Figure 2:
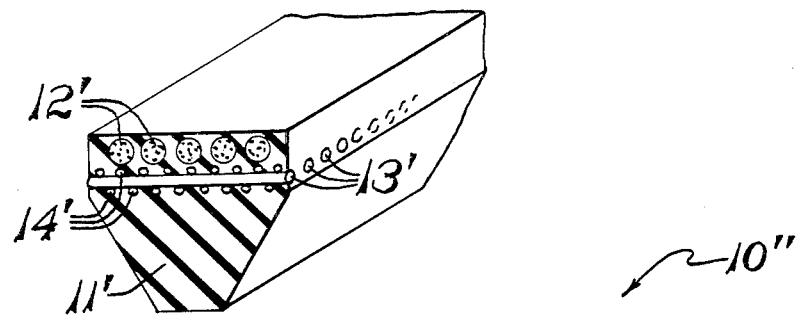
FIG. 2 is a view similar to FIG. 1 but showing another embodiment of the invention.

The lateral stiffening layer may be provided inwardly of the tension resisting members 12 of the belt rather than outwardly thereof. This construction is shown in FIG. 2, wherein the parts of similar nature to those in FIG. 1 have the same numeral but with a prime affixed. Thus, as illustrated, the lateral stiffening monofilaments 13' of the belt 10' are disposed between the compression portion 11' and the tension resisting elements 12'. The lateral stiffening elements 13' are, as in the embodiment illustrated in FIG. 1, preferably nylon monofilaments interlooped by binding elements 14' which are preferably cotton cords or yarns. The belt as shown in FIG. 2 is constructed in the same manner as shown in FIG. 1 except that the fabric comprising the monofilaments 13' and binding elements 14' is applied to the elastomer forming the compression section 11' before the tension resisting cords 12' are applied. The layer of elastomer calendered upon the lateral stiffening material is in this instance, however inverted as it is applied to the building drum so that the elastomer on the stiffening layer will, as in the belt illustrated in FIG. 1, be adjacent the tension resisting members. The tension resisting cords 12' are also preferably provided with a coating of elastomer so that they are not exposed on the outer surface of the belt in the event the belt is employed without a cover.

Figure 3:
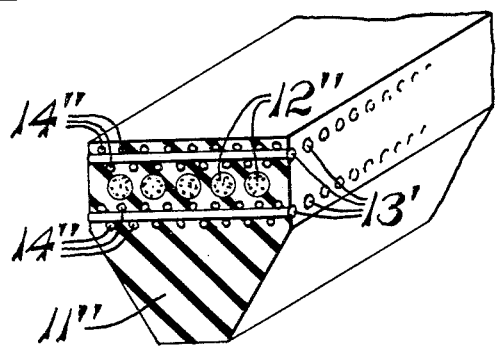
FIG. 3 is a view similar to FIG. 1 but showing a still different embodiment of the invention.

FIG. 3 illustrates a still different embodiment of the invention wherein lateral stiffening layers are provided on both sides of the tension resisting elements. In this figure, wherein the materials of like characteristics to those in FIG. 1 bear the same reference numerals but with a double prime affixed, the belt 10" is constructed with a layer 13" of monofilaments united by binding elements 14" disposed between the compression portion 11" and the tension resisting cords 12". Above the tension resisting cords 12" is a second layer of laterally extending monofilaments 13" united by longitudinally extending binding elements 14". A belt of this type is constructed in a manner which need not be separately described since it employs steps which will be readily apparent from the prior description of the construction of belts 10 and 10'.

The principle of the invention may be employed in industrial belts of configurations other than those of substantially V cross section by utilizing one or more layers of the transverse or laterally extending monofilaments to provide the lateral stiffening in the same manner as described for the illustrated embodiments. The elastomers employed in the belts embodying the invention may be of any known composition suitable for industrial belts and the tension resisting members may be of a size and composition appropriate for the dimensions and horsepower rating of the belt employed. The details of these characteristics need not be provided since they are well understood in the art. The dimensions of the lateral stiffening monofilaments 13 will, of course, vary depending upon the dimensions of the belts but, by way of example and without limitation thereto, those monofilaments may be in the range of 15 to 20 mil size for belts having an outer lateral width of ⅛ to 1 inch. These monofilaments are incorporated in a fabric formed of cotton cords interwoven about the monofilaments to cover the latter, the gauge of the composite fabric being in the range of .029 inch to .035 inch for belts of the ⅛ to 1 inch width.

Although the invention has been illustrated and described in detail as it is incorporated in the presently preferred form and certain modifications thereof, it will be understood that these descriptions and illustrations are by way of example and not limitations upon the invention since variations may be made in the illustrated and described features. Moreover, the invention is not limited to use in side driving belts which are substantially V-shape in cross section but can be employed in industrial belts of other types where transverse rigidity is required. Hence, the invention is not limited except as required by the spirit and scope of the appended claims.

Having thus described the invention, I claim:

1. An industrial belt including a body of elastomer provided with at least one layer of longitudinally extending tension resisting cords and a lateral stiffening means, the said lateral stiffening means comprising at least one layer of uncrimped monofilaments extending parallel to each other and substantially at right angles to the said tension resisting cords on one side of the latter with textile binding elements extending longitudinally of the belt and interlooped only about the said monofilaments in said layer thereof and with none of said binding elements extending between said tension resisting cords, the said binding elements having a greater adhesion to the elastomer than said monofilaments with said binding elements substantially covering said monofilaments.

2. A belt as defined in claim 1 wherein the said binding elements are cotton cords.

3. A belt as defined in claim 1 wherein the said lateral stiffening means is a woven fabric comprising a weft of uncrimped nylon monofilaments united by a warp of cotton cords.

4. A belt as defined in claim 1 wherein the said lateral stiffening means is a single layer disposed between the tension resisting cords and the outer surface of the belt.

5. A belt as defined in claim 4 wherein the said lateral stiffening means is a woven fabric comprising a weft of uncrimped nylon monofilaments united by a warp of cotton cords.

6. A belt as defined in claim 1 wherein the said lateral stiffening means is a single layer of said monofilaments disposed between the tension resisting cord and the inner surface of the belt.

7. A belt as defined in claim 6 wherein the said lateral stiffening means is a woven fabric comprising a weft of uncrimped nylon monofilaments united by a warp of cotton cords.

8. A belt as defined in claim 1 wherein the said lateral stiffening means comprises a first layer of the said monofilaments disposed between the tension resisting cords and the outer surface of the belt and a second layer of the said monofilaments disposed between the said tension resisting cords and the inner surface of the belt.

9. A belt as defined in claim 8 wherein the said lateral stiffening means is a woven fabric comprising a weft of uncrimped nylon monofilaments united by a warp of cotton cords.

References Cited

UNITED STATES PATENTS

| 3,297,514 | 1/1967 | Poeschl et al. | 161—92 X |
| 3,297,513 | 1/1967 | Robinson | 161—144 X |
| 3,205,119 | 9/1965 | Paul | 161—91 |
| 2,784,130 | 3/1957 | Kalin | 161—91 X |
| 3,298,417 | 1/1967 | Keefe | 74—232 X |
| 3,122,934 | 3/1964 | Fine | 161—144 X |
| 2,578,885 | 12/1951 | Huff | 161—140 X |

ROBERT F. BURNETT, Primary Examiner

M. A. LITMAN, Assistant Examiner

U.S. Cl. X.R.

161—91, 96, 98, 144; 74—232; 198—190, 193